US012789901B2

(12) United States Patent
Tummers et al.

(10) Patent No.: US 12,789,901 B2
(45) Date of Patent: Nov. 10, 2026

(54) CAST SUBFRAME HAVING AN ANGLED FRACTURE JOINT

(71) Applicant: Rivian IP Holdings, LLC, Irvin, CA (US)

(72) Inventors: Matthew James Tummers, Mississauga (CA); Jiacheng Huang, Irvine, CA (US); Guillermo Maudes Comendador, London (GB); Christopher Eanes, Trabuco Canyon, CA (US); Christophe Sartiaux, Long Beach, CA (US); Allen Martin Orchard, Shepperton (GB); Barry Lett, Surrey (GB)

(73) Assignee: Rivian IP Holdings, LLC, Irvine, CA (US)

( * ) Notice: Subject to any disclaimer, the term of this patent is extended or adjusted under 35 U.S.C. 154(b) by 511 days.

(21) Appl. No.: 18/241,004

(22) Filed: Aug. 31, 2023

(65) Prior Publication Data

US 2024/0217582 A1 Jul. 4, 2024

Related U.S. Application Data

(60) Provisional application No. 63/436,250, filed on Dec. 30, 2022.

(51) Int. Cl.
*B62D 21/15* (2006.01)
*B62D 27/00* (2006.01)

(52) U.S. Cl.
CPC ........... *B62D 21/155* (2013.01); *B62D 27/00* (2013.01)

(58) Field of Classification Search
CPC .... B62D 21/152; B62D 21/155; B62D 21/11; B62D 27/00; B62D 27/04; B62D 27/023; B60R 19/34
USPC ........... 296/187.09, 193.09, 203.02; 293/133
See application file for complete search history.

(56) References Cited

U.S. PATENT DOCUMENTS

| | | | | |
|---|---|---|---|---|
| 10,717,468 | B2 * | 7/2020 | Hara | B62D 21/152 |
| 2004/0119321 | A1 * | 6/2004 | Kasuga | F16F 7/12 296/205 |
| 2012/0056447 | A1 * | 3/2012 | Yoshida | B62D 21/155 296/193.09 |
| 2018/0312198 | A1 * | 11/2018 | Shimizu | B60K 1/04 |
| 2019/0176891 | A1 * | 6/2019 | Sawatzki | B62D 21/11 |
| 2019/0322164 | A1 * | 10/2019 | Sasaki | B62D 21/155 |
| 2020/0010123 | A1 * | 1/2020 | Fujii | B60K 1/04 |

(Continued)

OTHER PUBLICATIONS

"Subframes & Engine Cradles", Aluminum Extruders Council, retrieved from https://aec.org/page/subframes-engine-cradles, retrieved on Jan. 25, 2023, published on Dec. 7, 2022 (9 pages).

*Primary Examiner* — Wenwei Zhuo
(74) *Attorney, Agent, or Firm* — HG LAW LLP

(57) ABSTRACT

Systems and methods are presented herein for a vehicle subframe assembly. The vehicle subframe assembly comprises a first casting comprising a first fracture joint surface, wherein the first fracture joint surface comprises a first angled profile. A second casting comprising a second fracture joint surface with a second angled profile is configured to interface with the first angled profile. The vehicle subframe assembly comprises a shear plate, wherein a first end of the shear plate is fixedly attached to the first casting; and a second end of the shear plate is fixedly attached to the second casting.

18 Claims, 11 Drawing Sheets

(56) References Cited

U.S. PATENT DOCUMENTS

| | | | | |
|---|---|---|---|---|
| 2022/0204088 | A1* | 6/2022 | Anzai .................... | B62D 21/11 |
| 2024/0093708 | A1* | 3/2024 | Mitsunobu ............... | C21D 9/46 |

* cited by examiner

600

CAST SUBFRAME HAVING AN ANGLED FRACTURE JOINT

CROSS-REFERENCE TO RELATED APPLICATIONS

This application claims the benefit of U.S. Provisional Patent Application No. 63/436,250 filed Dec. 30, 2022, the disclosure of which is hereby incorporated by reference herein in its entirety.

INTRODUCTION

The present disclosure is directed to a front subframe assembly, and more particularly, to a front subframe assembly comprised of two separate castings that are configured to mechanically deform in response to a front impact event (e.g., a 35 mph front impact) in a manner that prevents damage to components of a vehicle assembly comprised of the front subframe assembly.

SUMMARY

In some example embodiments, two separate castings are formed. A main casting, coupled to a subframe crash can, is arranged below a steering assembly and fixedly attached to a front vehicle frame rail. The main casting comprises a pair of first angled fracture joint surfaces. Each of the first angled fracture joint surfaces is arranged to contact a second angled fracture joint surface of a rear mount casting. A pair of rear mount castings are arranged behind the main casting and each rear mount casting is fixedly attached at the second angled fracture joint surface to each of the first angled fracture joint surfaces. The contact surface between each of the first and second angled fracture joint surfaces are angled to guide the mechanical deformation of the front subframe assembly in response to a front impact event. In some embodiments, each of the main casting and the pair of rear mount castings are comprised of cast aluminum (e.g., A356 aluminum casting alloy).

When the front impact event results in an impact or compressive force that exceeds at least a yield strength of the angled fracture joint formed by connecting each of the first and second angled fracture joint surfaces, the angled fracture joint mechanically deforms (e.g., fractures). The main casting is configured to translate downward along the angle (e.g., 20-30 deg) of the second angled fracture joint surfaces. For example, if the second angled fracture joint surfaces have an angled surface that is approximately 25° below horizontal, then the first angled fracture joint surface of the main casting will translate along a trajectory of 25° below horizontal. The angle of the second angled fracture joint surface is important and, in some embodiments, 25° below horizontal enables a preferred deformation trajectory of the main casting. If the angle is too steep (e.g., closer to vertical), then the impact force or impact load would transfer to body mount connections (or other components and features of the vehicle assembly) arranged rearward of the front subframe assembly. As the load transfers to other components, the deformation of the vehicle assembly may result in contact to other systems, such as a power source like a battery system. If the angle is too shallow (e.g., closer to horizontal), the main casting would not be pushed downwards in response to a front impact event that exceeds the yield force of the angled fracture joint. This also creates a risk that the main casting deforms in a manner that compresses components and features of the vehicle assembly towards other systems or subassemblies of the vehicle assembly arranged rearward of the front subframe assembly.

In some embodiments, a shear plate is affixed at a first end to the main casting. The shear plate may be comprised of steel (e.g., AR550). The shear plate is also affixed at a second end to one of the rear mount castings. A pair of shear plates may be used where there are two rear mount castings in the front subframe assembly. The deformation trajectory of the main casting movement (e.g., in response to a front impact event that exceeds at least the yield strength of the assembled fracture joint) is controlled or guided by the shear plate. The shear plate is stiff enough along the length of the shear plate such that the shear plate does not bend between the first end and the second end in response to the front impact event exceeding the yield strength of the assembled fracture joint. As a result, the shear plate functions as a hinge to drop the main casting down at a first end of the shear plate. Since the second end of the shear plate remains affixed to the rear mount casting, the first end of the shear plate is then guided (e.g., along an arc with a radius approximately the distance between mounting locations of the first and second end of the shear plate) below components arranged rearward of the rear mount casting. This prevents deformation of the front subframe assembly from affecting other systems (e.g., a battery system or steering system).

In some embodiments, the disclosure is directed to a vehicle subframe assembly. The vehicle subframe assembly comprises a first casting comprising a first fracture joint surface, wherein the first fracture joint surface comprises a first angled profile. A second casting comprising a second fracture joint surface, with a second angled profile, is configured to interface with the first angled profile. The vehicle subframe assembly also comprises a shear plate, wherein a first end of the shear plate is fixedly attached to the first casting; and a second end of the shear plate is fixedly attached to the second casting.

In some embodiments, the first angled profile extends upwards from a rear edge of the first fracture joint surface at an angle between 20 and 30 degrees above a horizontal plane defined by the rear edge. Additionally, or alternatively, the shear plate is comprised of two layers and at least one layer is comprised of at least one deformation initiation feature. In some embodiments, the second casting is comprised of a hole configured to interface with a frame rail by at least one fastener. The second casting is fixedly attached to a frame crossmember. The shear plate comprises at least one deformation initiation feature configured to cause deformation of the shear plate that separates the first casting from the second casting.

In some embodiments, a fastener is arranged to compress the first fracture joint surface against the second fracture joint surface. Additionally, or alternatively, the shear plate is comprised of two layers and the two layers are fixedly attached to each other by at least one first fastener at a first end. One of the two layers is fixedly attached to a crossmember of a vehicle frame at a second end. In some embodiments, the first end of the shear plate is fixedly attached to the first casting by a first pair of fasteners and the second end of the shear plate is fixedly attached to the second casting by a second pair of fasteners.

In some embodiments, the disclosure is directed to a subframe fracture joint. The subframe fracture joint comprises a first casting. The first casting comprises a first fracture joint surface, wherein the first fracture joint surface comprises a first angled profile. The subframe fracture joint also comprises a second casting comprising a second fracture joint surface, wherein the second fracture joint surface comprises a second angled profile configured to interface with the first angled profile. A fastener is arranged to compress the first fracture joint surface against the second fracture joint surface. In some embodiments, the first angled profile extends upwards from a rear edge of the first fracture joint surface at an angle between 20 and 30 degrees above a horizontal plane defined by the rear edge. In some embodiments, the second angled profile extends downwards from a front edge of the second fracture joint surface at an angle between 20 and 30 degrees below a horizontal plane defined by the front edge.

In some embodiments, the first casting is fixedly attached to a frame rail. In another embodiment, the second casting is fixedly attached to a frame crossmember. Additionally, or alternatively, the second casting comprises a mount for a vehicle component.

In some embodiments, a front end of a shear plate is fixedly attached to the first casting, and a rear end of the shear plate is fixedly attached to the second casting. The shear plate comprises a deformation initiating feature. In some embodiments, the front end of the shear plate is fixedly attached to the first casting by a first pair of fasteners, and the rear end of the shear plate is fixedly attached to the second casting by a second pair of fasteners.

In some embodiments, the disclosure is directed to a front subframe assembly comprising a first casting coupled to a frame rail, the first casting comprising a first angled joint surface, a second casting coupled to a crossmember affixed to the frame rail, the second casting comprising a second angled joint surface, a fastener compressing the first angled joint surface to the second angled joint surface, and a shear plate, wherein a first end of the shear plate is coupled to the first casting and a second end of the shear plate is coupled to the second casting. The first angled joint surface comprises a first angled profile that extends upwards from a rear edge of the first fracture joint surface at an angle between 20 and 30 degrees above a horizontal plane defined by the rear edge. The second angled joint surface comprises a second angled profile that extends downwards from a front edge of the second fracture joint surface at an angle between 20 and 30 degrees below a horizontal plane defined by the front edge.

In some embodiments, the first casting is configured to mechanically deform to release the fastener in response to a front impact event and the second casting comprises a mount for a vehicle component.

In some embodiments, the shear plate comprises a deformation initiating feature. The front end of the shear plate is fixedly attached to the first casting by a first pair of fasteners, and the rear end of the shear plate is fixedly attached to the second casting by a second pair of fasteners. The shear plate is configured to remain fixedly attached to each of the first casting and the second casting in response to a front impact event. A length of the shear plate corresponds to a deformation arc radius of the first casting such that the first casting avoids vehicle components arranged rearward of the front subframe assembly.

In some embodiments, the disclosure is directed to a vehicle frame comprising a frame rail, a crossmember fixedly attached to the frame rail, and a front subframe assembly coupled to the frame rail and the crossmember. The front subframe assembly comprises a first casting comprising a first angled joint surface, a second casting comprising a second angled joint surface, a fastener compressing the first angled joint surface to the second angled joint surface, and a shear plate, wherein a first end of the shear plate is coupled to the first casting and a second end of the shear plate is coupled to the second casting.

In some embodiments, the disclosure is directed to a method of manufacturing a front subframe assembly. A first angled joint surface of a first subframe member is coupled to a second angled joint surface of a second subframe member, wherein the first angled joint surface comprises a first angled profile that extends upwards from a rear edge of the first fracture joint surface at an angle between 20 and 30 degrees above a horizontal plane defined by the rear edge. A first end of a shear plate is coupled to the first subframe member. A second end of the shear plate is coupled to the second subframe member which is comprised of a second angled joint surface, wherein the second angled joint surface comprises a second angled profile that extends downwards from a front edge of the second fracture joint surface at an angle between 20 and 30 degrees below a horizontal plane defined by the front edge.

BRIEF DESCRIPTIONS OF THE DRAWINGS

The above and other objects and advantages of the disclosure may be apparent upon consideration of the following detailed description, taken in conjunction with the accompanying drawings, in which:

FIGS. 1A, 1B, 1C, and 1D each illustrate exemplary subframe fracture joints, in accordance with some embodiments of the disclosure;

DETAILED DESCRIPTION

Methods and systems are provided herein for a front subframe assembly comprised of two separate castings that are configured to mechanically deform in response to a front impact event in a manner that, for example, prevents damage to components of a vehicle assembly comprised of the front subframe assembly.

Figure 1A:
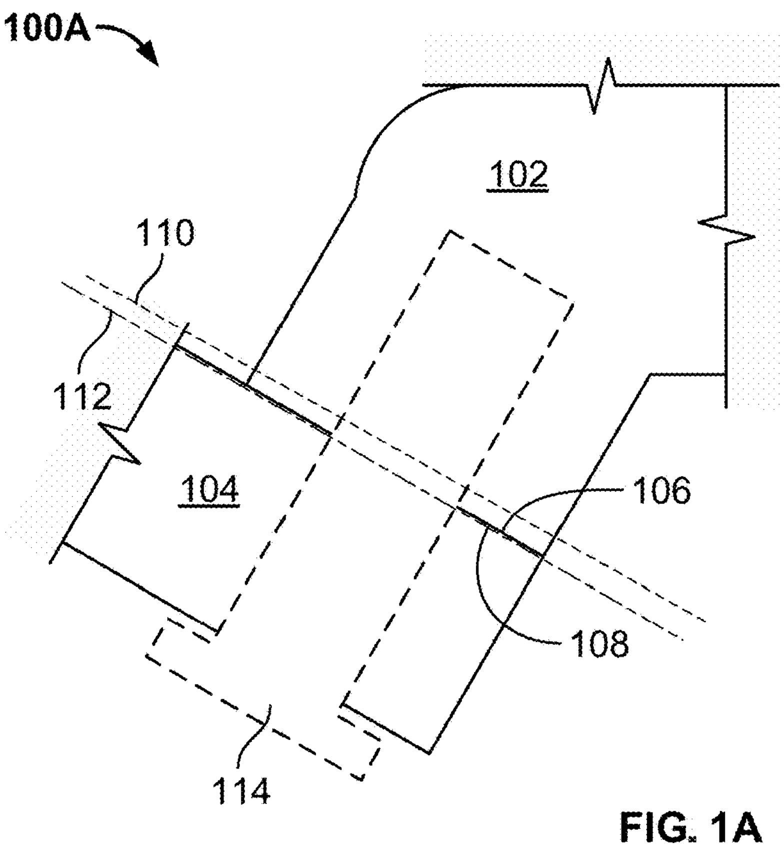

FIG. 1A depicts subframe fracture joint 100A, in accordance with some embodiments of the disclosure. Subframe fracture joint 100A may be incorporated, in whole or in part, to any of FIGS. 1B-7. Subframe fracture joint 100A may be manufactured, in whole or in part, by method 800 of FIG. 8.

Subframe fracture joint 100A is comprised of first casting 102 and second casting 104. First casting 102 has first fracture joint surface 106 arranged to face second fracture joint surface 108 of second casting 104. First fracture joint surface 106 is comprised of first angled profile 110, which complements or corresponds to second angled profile 112 of second fracture joint surface 108. Second angled profile 112 is configured to interface with (e.g., abut, press, be compressed against) first angled profile 110. Fastener 114 is arranged to compress first fracture joint surface 106 (e.g., corresponding to first angled profile 110) against second fracture joint surface 108 (e.g., corresponding to second angled profile 112).

Figure 1B:
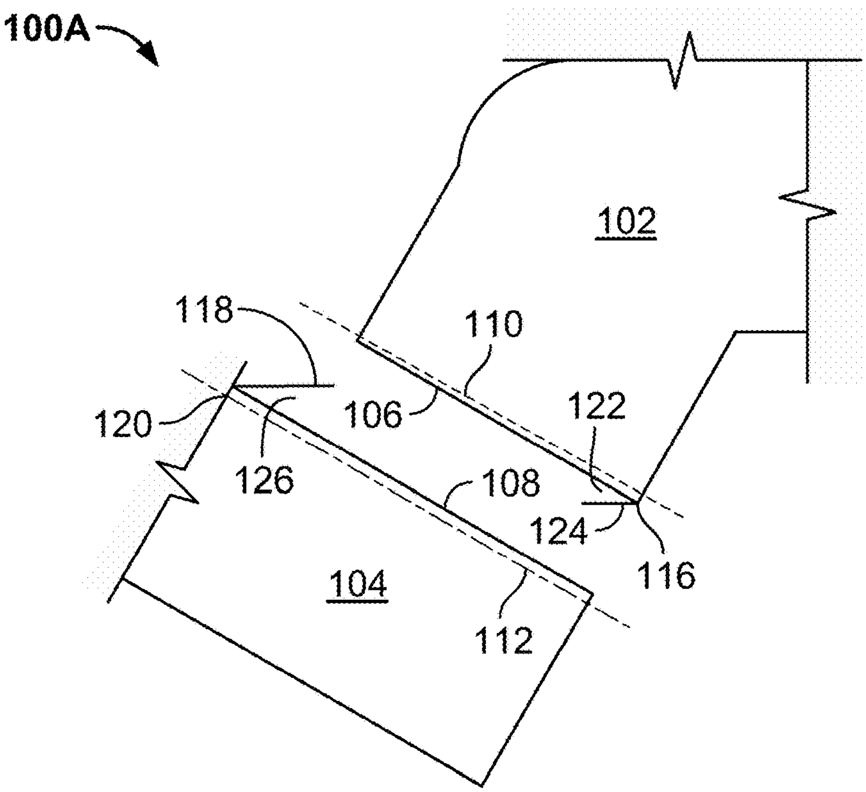

FIG. 1B depicts subframe fracture joint 100A from FIG. 1 in a separated state (e.g., without fastener 114), in accordance with some embodiments of the disclosure. First angled profile 110 extends upwards from rear edge 116 of first fracture joint surface 106. In some embodiments, angle 124 of first angled profile 110 is an angle between 20 and 30 degrees (e.g., 25 degrees) above horizontal plane 124, as defined by rear edge 116. Second angled profile 112 extends downwards from front edge 120 of second fracture joint surface 108. In some embodiments, angle 126 of second angled profile 110 is also an angle between 20 and 30 degrees (e.g., 25 degrees), extending below and away from horizontal plane 118 defined by front edge 120. It will be understood that castings 102 and 104 of FIGS. 1A and 1B represent simplified castings to illustrate subframe fracture joint 100A. Castings 102 and 104 may each have any suitable shapes and features for interfacing with other components of a vehicle as part of a subframe assembly.

Figure 1C:
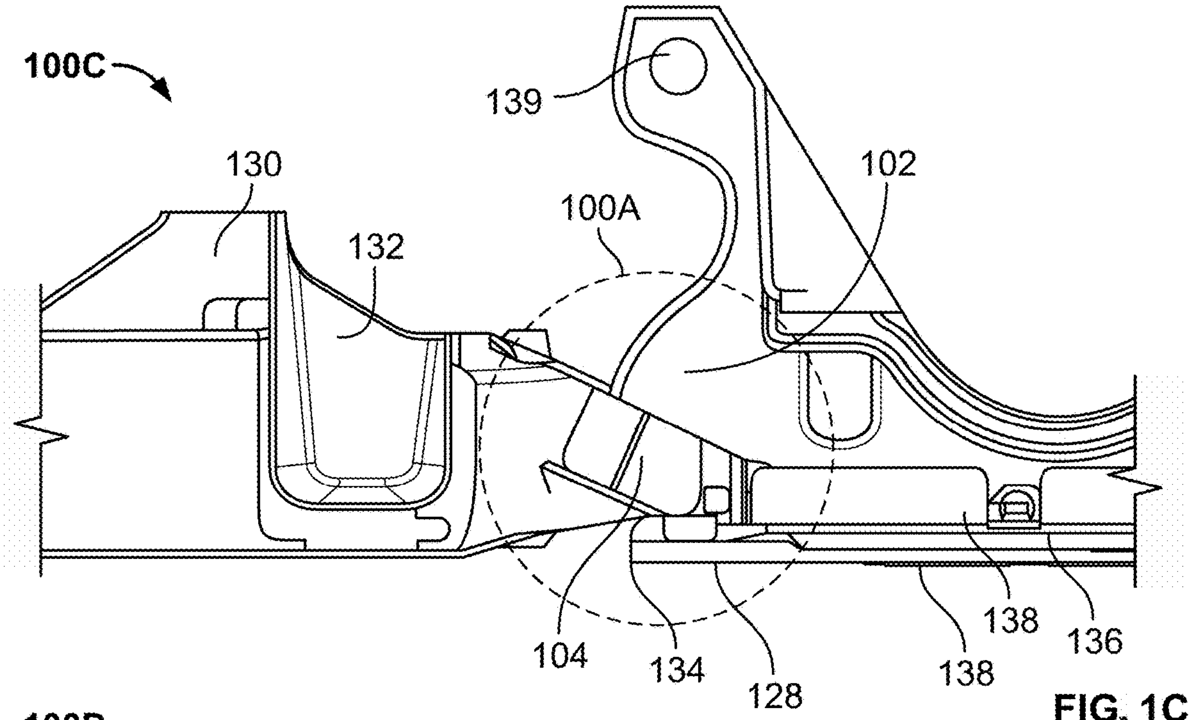

FIG. 1C depicts subframe fracture joint assembly 100C, in accordance with some embodiments of the disclosure. Subframe fracture joint assembly 100C may be incorporated, in whole or in part, to any of FIGS. 1A, 1B, and 1D-7. Subframe fracture joint assembly 100C may be manufactured, in whole or in part, by method 800 of FIG. 8.

Figure 1D:
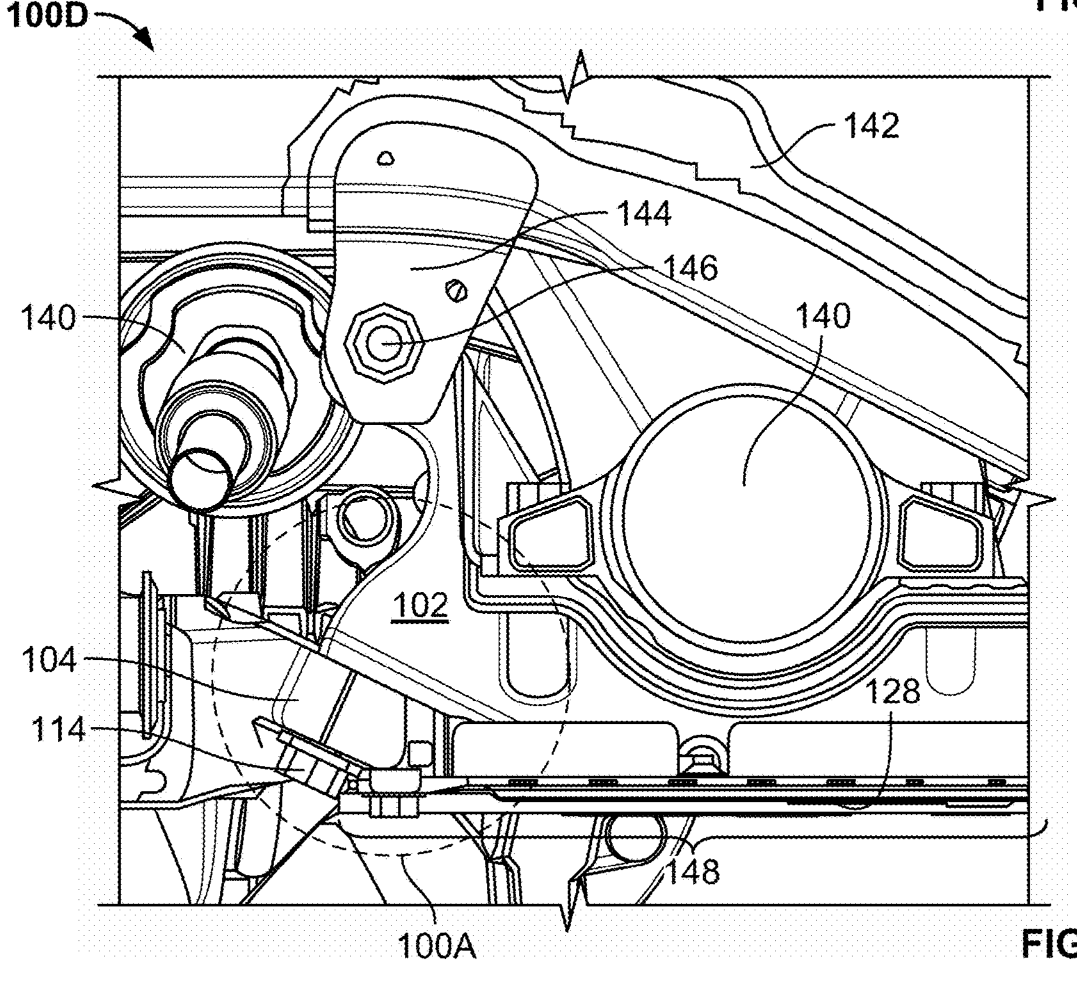

Subframe fracture joint assembly 100C is comprised of subframe fracture joint 100A, shear plate 128, and frame component 130. First casting 102 of subframe fracture joint 100A is fixedly attached to a frame rail (not shown). Second casting 104 of subframe fracture joint 100A is fixedly attached to a frame crossmember. Second casting 104 is comprised of mount 132 for a vehicle component. Mount 132 is a feature of frame component 130. Frame component 130 may be comprised of at least one of a frame rail, a frame crossmember, a mount of a vehicle frame, and combinations thereof. Front end 134 of shear plate 128 is fixedly attached to second casting 104. In some embodiments, at least one fastener is used to secure front end 134 to first casting 102 (e.g., a pair of fasteners may be utilized). Rear end 136 of shear plate 128 is fixedly attached to first casting 102. In some embodiments, at least one fastener is used to secure rear end 136 to second casting 104 (e.g., a pair of fasteners may be utilized). Shear plate 128 is comprised of deformation initiating features 138. Deformation initiating features 138 may comprise at least one of a rib, a cutout, a recess, and related structures formed on a surface of shear plate 128. Hole 139 is configured to receive fastener 146 to secure first casting 102 to frame rail 142, as shown in FIG. 1D. Hole 139 restricts movement of first casting 102 in the vertical direction during an impact event (e.g., an impact event as described in reference to this disclosure). By incorporating hole 139 into the assembly, first casting 102 remains stationary relative to frame rail 142, which direct forces through better holding the first casting stationary and directing the forces through shear plate 128 such that shear plate 128 deforms and moves in response to an impact event as described in this disclosure.

FIG. 1D depicts front subframe assembly 100D, in accordance with some embodiments of the disclosure. Front subframe assembly 100D may be incorporated, in whole or in part, to any of FIGS. 1A-1C and 2-7. Front subframe assembly 100D may be manufactured, in whole or in part, by method 800 of FIG. 8. In some embodiments, front subframe assembly 100D corresponds to front assembly 100C with the addition of other surrounding components.

Figure 3B:
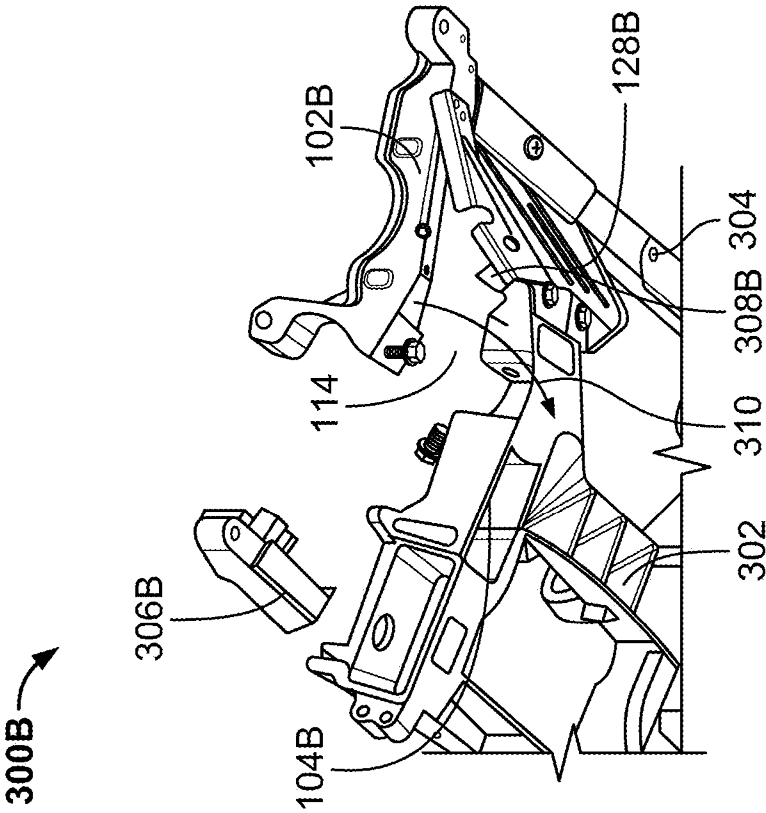
FIG. 3B is an under view of a front subframe assembly comprised of a subframe fracture joint after the front subframe assembly experiences a front impact event, in accordance with some embodiments of the disclosure.

Front subframe assembly 100D is comprised of subframe fracture joint 100A, shear plate 128, front vehicle components 140, and frame rail 142. First casting 102 is coupled to frame rail 142 using frame rail tab 144 and fastener 146. Second casting 104 is coupled to a crossmember (not shown) affixed to frame rail 142. Fastener 114 compresses first casting 102 against second casting 104 at angled fracture joint surfaces. Shear plate 128 is coupled to first casting 102 at a first end and a second end of shear plate 128 is coupled to second casting 104. First casting 102 is configured to mechanically deform to release fastener 114 in response to a front impact event. Shear plate 128 is configured to remain fixedly attached to each of first casting 102 and second casting 104 in response to a front impact event. Length 148 of shear plate 128 corresponds to a deformation arc radius of first casting 102 (e.g., as shown in FIG. 3B) such that first casting 102 avoids vehicle components arranged rearward of front subframe assembly 100D. Front vehicle components 140 correspond to at least one of a steering system, a suspension system, a braking system, a propulsion system, or combinations thereof.

Figure 2A:
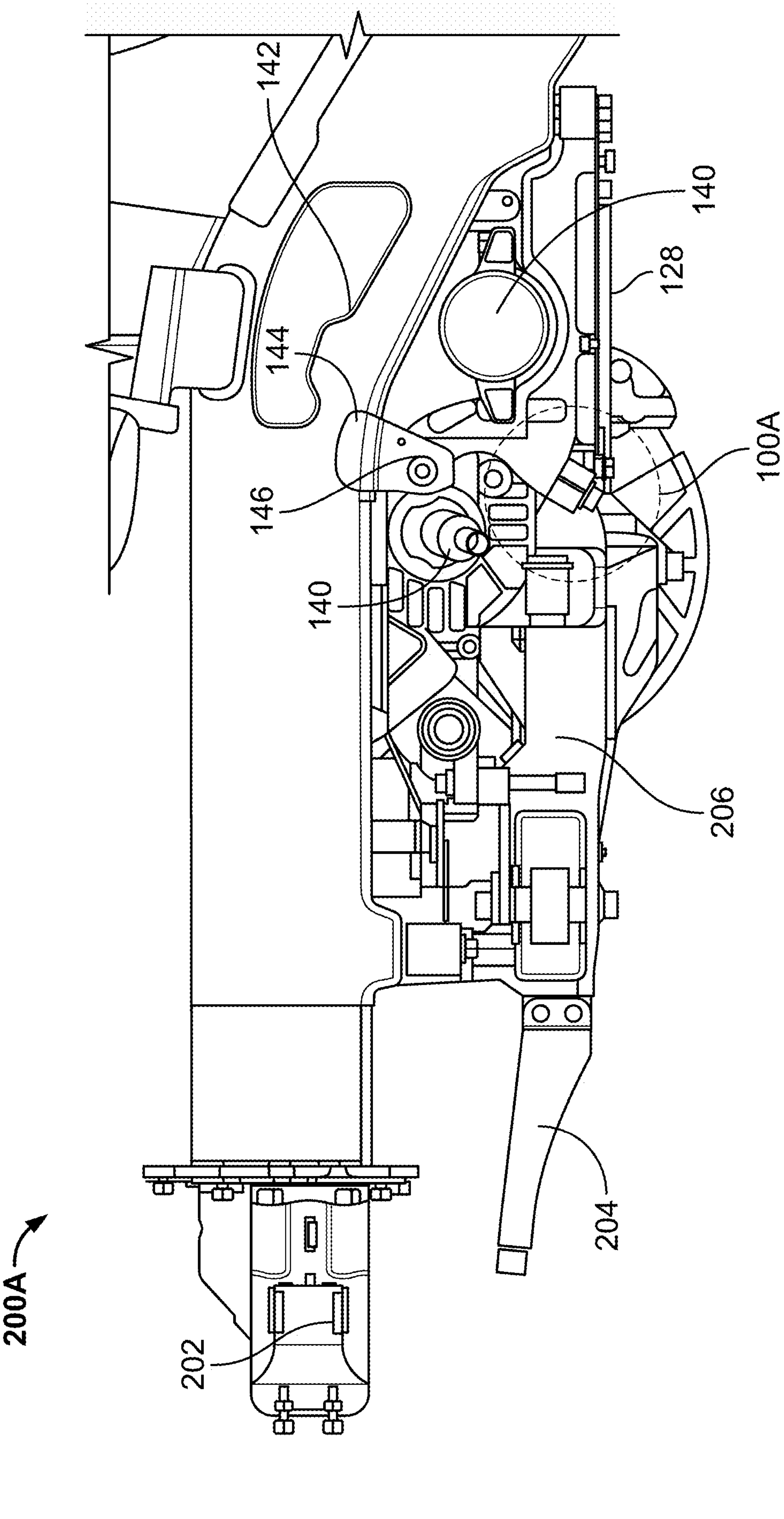
FIG. 2A is a side view of a front subframe assembly comprised of a subframe fracture joint before the front subframe assembly experiences a front impact event, in accordance with some embodiments of the disclosure.

FIG. 2A is a side view of front subframe assembly 200A comprised of subframe fracture joint 100A before front subframe assembly 200A experiences a front impact event, in accordance with some embodiments of the disclosure. Front subframe assembly 200A may be incorporated, in whole or in part, to any of FIGS. 1A-1D and 2B-7. Front subframe assembly 200A may be manufactured, in whole or in part, by method 800 of FIG. 8.

Front subframe assembly 200A is comprised of frame rail 142 and subframe rail 206. Arranged towards a front end of frame rail 142 is impact deformation structure 202, which is configured to mechanically deform before frame rail 142. Arranged below impact deformation structure 202 and positioned behind a front edge of impact deformation structure 202 is subframe deformation structure 204. Subframe deformation structure 204 is configured to receive impacts along a lower trajectory than impacts experienced by impact deformation structure 202. Subframe deformation structure 202 is configured to mechanically deform before subframe rail 206. Subframe rails 206 may be incorporated into or affixed to subframe fracture joint 100A (e.g., by being a part of first casting 102 or second casting 104). Front vehicle components 140 are arranged to interface, either directly or by mounts, with at least one of frame rail 142 or subframe rail 206. Frame rail tab 144 and fastener 146 are used to couple an extension of second casting 104 of subframe fracture joint 100A to frame rail 142. Shear plate 128 is affixed to both first casting 102 and second casting 104 of subframe fracture joint 100A.

Figure 2B:
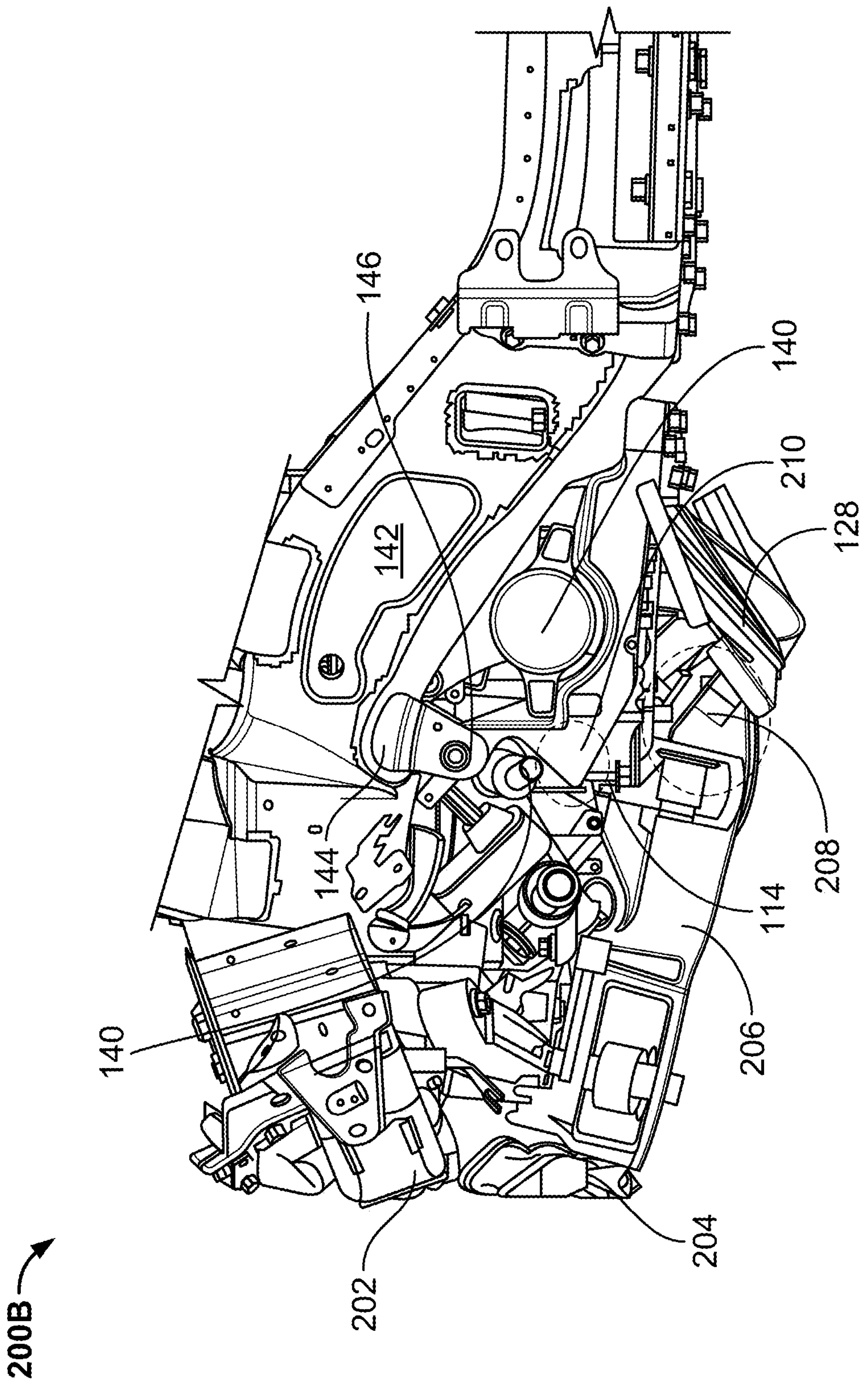
FIG. 2B is a side view of a front subframe assembly comprised of a subframe fracture joint after the front subframe assembly experiences a front impact event, in accordance with some embodiments of the disclosure.

FIG. 2B is a side view of post impact front subframe assembly 200B after the front subframe assembly of FIG. 2A experiences a front impact event, in accordance with some embodiments of the disclosure. Post impact front subframe assembly 200B may be incorporated, in whole or in part, to any of FIGS. 1A-2A, and 3A-7. Post impact front subframe assembly 200B may be manufactured, in whole or in part, by method 800 of FIG. 8.

Post impact front subframe assembly 200B is comprised of frame rail 142 and subframe rail 206. Impact deformation structure 202 is shown in a post impact state of mechanical deformation such that frame rail 142 remains relatively unaffected visibly by deformation. Subframe deformation structure 204 is also shown in a post impact state of mechanical deformation such that subframe rail 206 retains the shape shown in FIG. 2A. Front vehicle components 140 are shown as being displaced along the length of frame rail 142 without experiencing mechanical deformation. Frame rail tab 144 and fastener 146 are shown as remaining engaged with an extension of second casting 104 of subframe fracture joint 100A. In some embodiments, fastener 146 may be configured to release frame rail tab 144 or second casting 104 in response to a front impact event. Shear plate 128 remains affixed to both first casting 102 and second casting 104 of subframe fracture joint 100A and guides subframe rail 206 down and away from front vehicle components 140. Shear plate 128 is shown having some mechanical deformation while remaining fixedly attached to both first casting 102 and second castings 104. In some embodiments, one or both ends of shear plate 128 may be released. First casting 102 is shown as being separated from fastener 114 in response to the front impact event. The separation of first casting 102 from second casting 104 at fastener 114 results in shear plate 128 being used to guide subframe rails 106 away from other vehicle components in response to a front impact event.

Figure 3A:
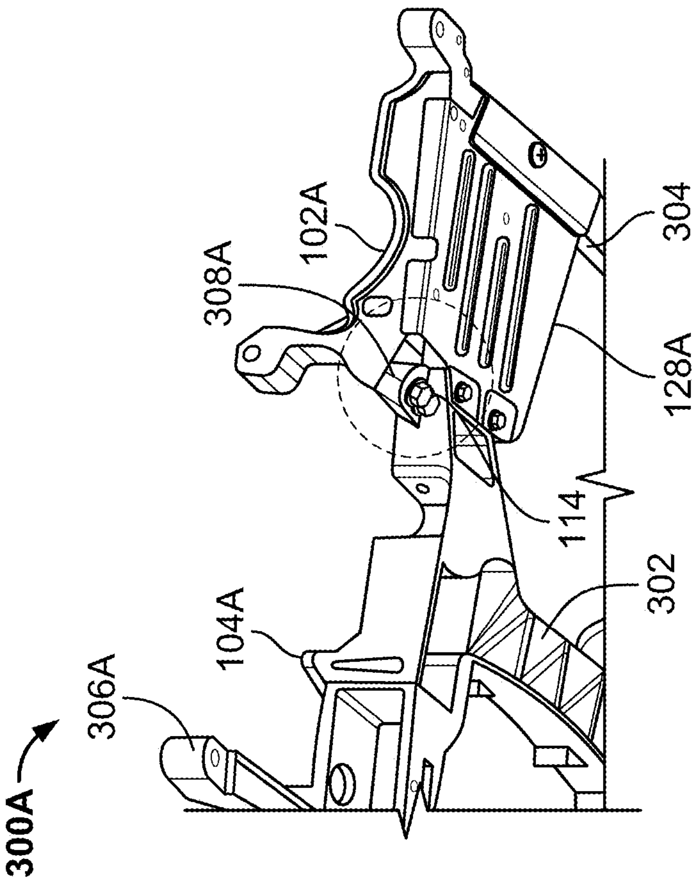
FIG. 3A is an under view of a front subframe assembly comprised of a subframe fracture joint before the front subframe assembly experiences a front impact event, in accordance with some embodiments of the disclosure.

FIG. 3A is a bottom perspective view of front subframe assembly 300A comprised of subframe fracture joint 100A before the front subframe assembly experiences a front impact event, in accordance with some embodiments of the disclosure. Front subframe assembly 300A may be incorporated, in whole or in part, to any of FIGS. 1A-2B and 3B-7. Front subframe assembly 300A may be manufactured, in whole or in part, by method 800 of FIG. 8.

Front subframe assembly 300A is configured to strategically mechanically deform in response to a front impact event. Second casting 104A is coupled to first casting 102A via fastener 114, which interfaces with deformation initiation feature 308A of second casting 104A. Deformation initiation feature 308A may comprise a cutout, a crease, or combination therefore to allow a portion of second casting 104A to mechanically release fastener 114 in response to a front impact event. As shown, shear plate 128A is secured to both first casting 102A and second casting 104A. Additionally, members 302 and 304 may correspond to crossmembers of a frame or subframe. Each of members 302 and 304 may comprise at least one vehicle component mount. Mount 306A corresponds to at least one of a subframe mount, vehicle component mount, or combination thereof. Mount 306A may be configured to mechanically deform in response to a front impact event to dissipate compressive loads from the impact event to result in a strategic deformation for the overall assembly (e.g., as shown in FIG. 3B).

FIG. 3B is a bottom perspective view of front subframe assembly 300B which corresponds to front subframe assembly 300A after front subframe assembly 300A experiences a front impact event, in accordance with some embodiments of the disclosure. Front subframe assembly 300B may be incorporated, in whole or in part, to any of FIGS. 1A-3A and 4A-7. Front subframe assembly 300B may be manufactured, in whole or in part, by method 800 of FIG. 8.

Front subframe assembly 300B is mechanically deformed in response to a front impact event. Second casting 104B is released from first casting 102B at fastener 114. Deformation initiation feature 308B has mechanically deformed such that second casting 104B is no longer secured to first casting 102B via fastener 114. Second casting 104B also comprises deformed mount 306B, which is shown as separated from a main body of second casting 104B in response to a front impact event. As shown, a front end of shear plate 128B remains secured to first second casting 104B while following arc 310 away from first casting 102B. Shear plate 128B is depicted with some mechanical twisting and deformation in response to the release of fastener 114 in response to the front impact event.

Figure 4B:
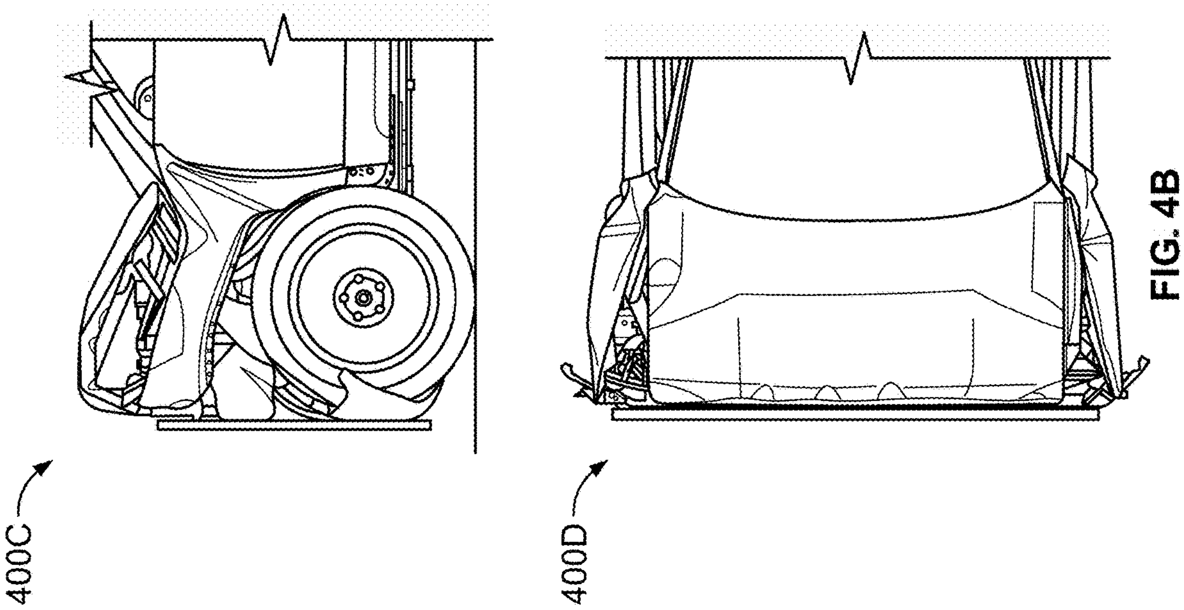
FIG. 4B depicts a pair of views of a vehicle after the vehicle experiences a front impact event, in accordance with some embodiments of the disclosure.
Figure 4A:
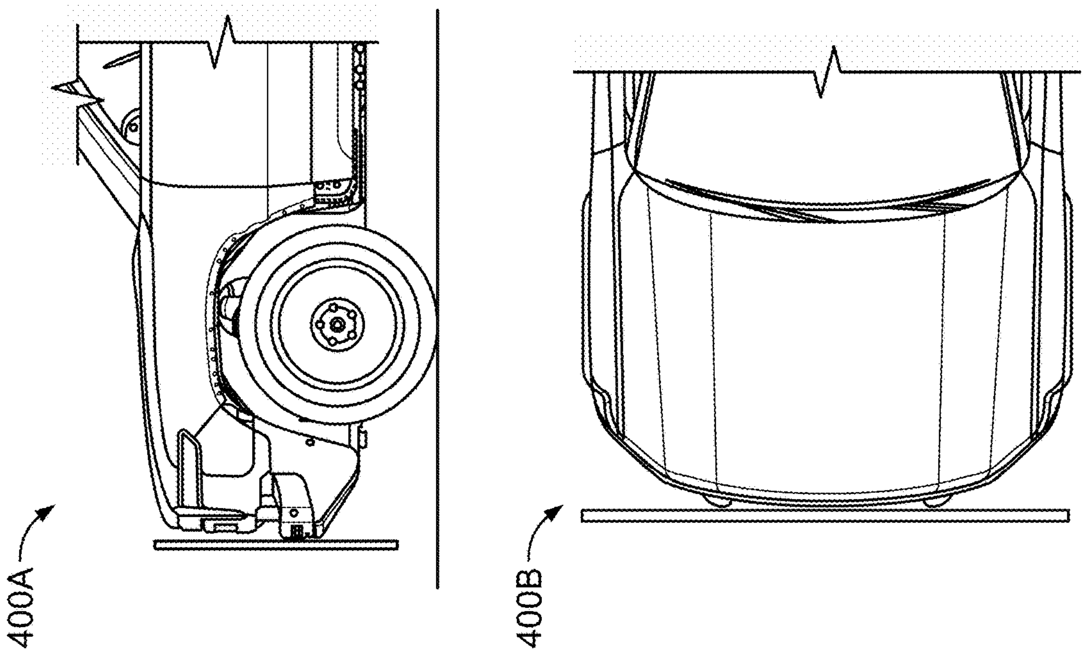
FIG. 4A depicts a pair of views of a vehicle before the vehicle experiences a front impact event, in accordance with some embodiments of the disclosure.

FIG. 4A depicts views 400A and 400B of a vehicle before the vehicle experiences a front impact event, in accordance with some embodiments of the disclosure. Views 400A and 400B comprise components that may be incorporated, in whole or in part, to any of FIGS. 1A-3B and 4B-7. The assemblies shown in views 400A and 400B may be manufactured, in whole or in part, by method 800 of FIG. 8.

View 400A is a side view of a front vehicle assembly, which incorporates subframe fracture joint 100A of FIG. 1 (not shown). The front suspension of the vehicle in view 400A may include any or all of the components shown in FIGS. 1A-3B. The vehicle is shown in a pre-deformation state. View 400B is a top view of a front vehicle assembly, which incorporates subframe fracture joint 100A of FIG. 1 (not shown). The front suspension of the vehicle in view 400B may include any or all of the components shown in FIGS. 1A-3B. The vehicle is shown in a pre-deformation state (e.g., before experiencing a front impact event).

FIG. 4B depicts views 400C and 400D of a vehicle after the vehicle experiences a front impact event, in accordance with some embodiments of the disclosure. Views 400C and 400D comprise components that may be incorporated, in whole or in part, to any of FIGS. 1A-4A and 5-7. The assemblies shown in views 400C and 400D may be manufactured, in whole or in part, by method 800 of FIG. 8.

View 400C is a side view of a front vehicle assembly after experiencing a front impact event and incorporates subframe fracture joint 100A of FIG. 1 (not shown) which would have separated first casting 102 and second casting 104 about fastener 114 of, for example, FIG. 1. The front suspension of the vehicle in view 400C may include any or all of the components shown in FIGS. 1A-3B. The front impact event may correspond to a head on 35 mph impact between the vehicle and at least one of a barrier or object. View 400D is a top view of a front vehicle assembly, which incorporates subframe fracture joint 100A of FIG. 1 (not shown) after experiencing the above referenced front impact event. The front suspension of the vehicle in view 400D may include any or all of the components shown in FIGS. 1A-3B. The vehicle is shown in a post-deformation state (e.g., after experiencing the front impact event such that subframe fracture joint 100A of FIG. 1 is separated, as shown in FIG. 3B).

Figure 5:
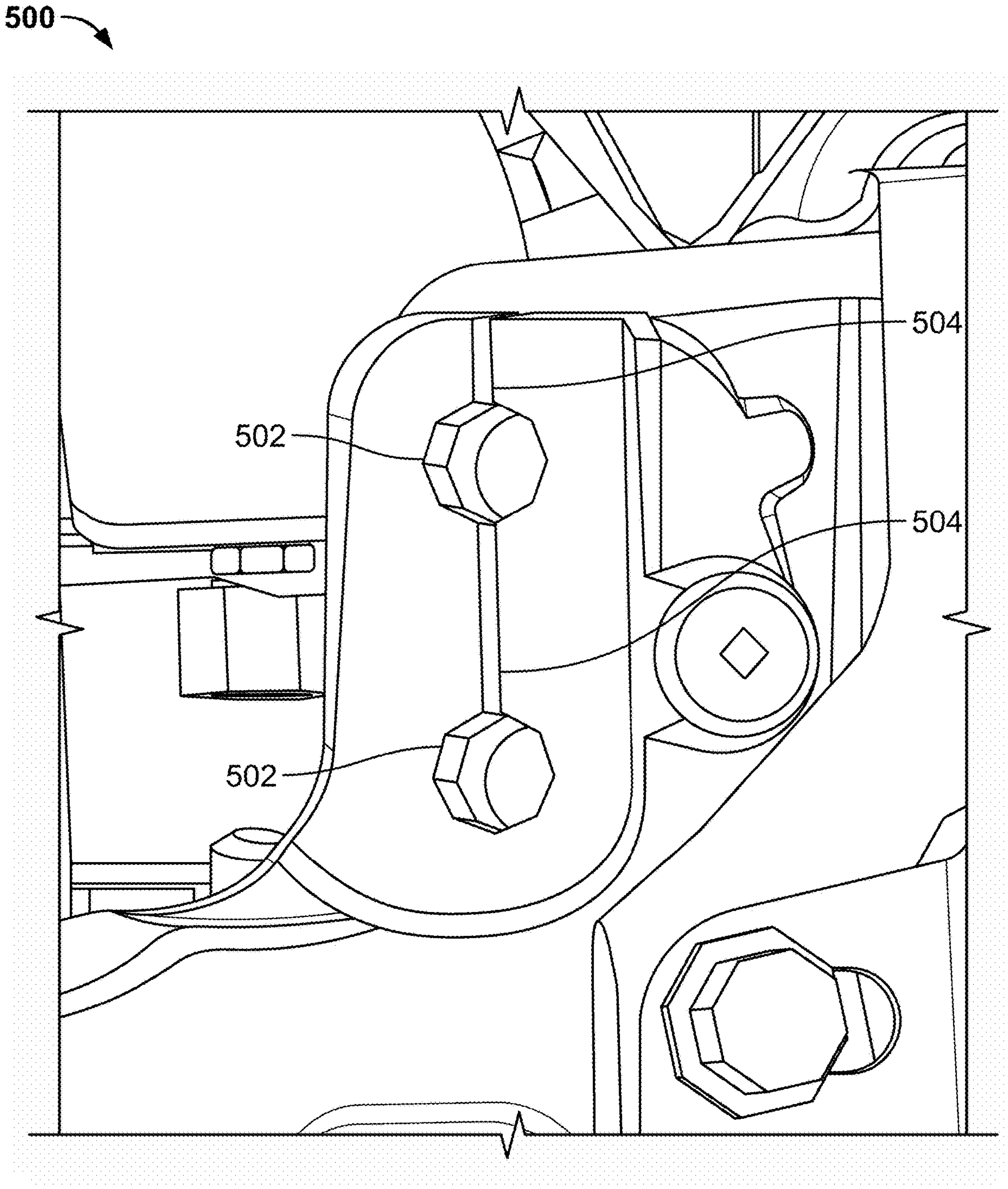
FIG. 5 depicts an exemplary deformation initiation feature of a subframe fracture joint, in accordance with some embodiments of the disclosure.

FIG. 5 depicts casting 500 of a subframe fracture joint (e.g., subframe fracture joint 100A of FIG. 1) with deformation initiation feature 504, in accordance with some embodiments of the disclosure. Casting 500 comprises components that may be incorporated, in whole or in part, to any of FIGS. 1A-4B 6, and 7. Casting 500 may be manufactured, in whole or in part, by method 800 of FIG. 8.

Casting 500 comprises fastener holes 502 and deformation initiation feature 504. Deformation initiation feature 504 corresponds to deformation initiation feature 308A of FIG. 3A. In some embodiments, deformation initiation features 504 may comprise a crease, a cutout, or combinations thereof. Deformation initiation feature 504 is configured to release one or more fasteners (e.g., depending on how many fasteners are used with respect to fastener holes 502) securing casting 500 to first casting 102 of FIG. 1, for example, in response to a front impact event. Casting 500 is structured to mechanically deform about deformation initiation feature 504 to enable second casting 104B of FIG. 3B to follow arc 310.

Figure 6:
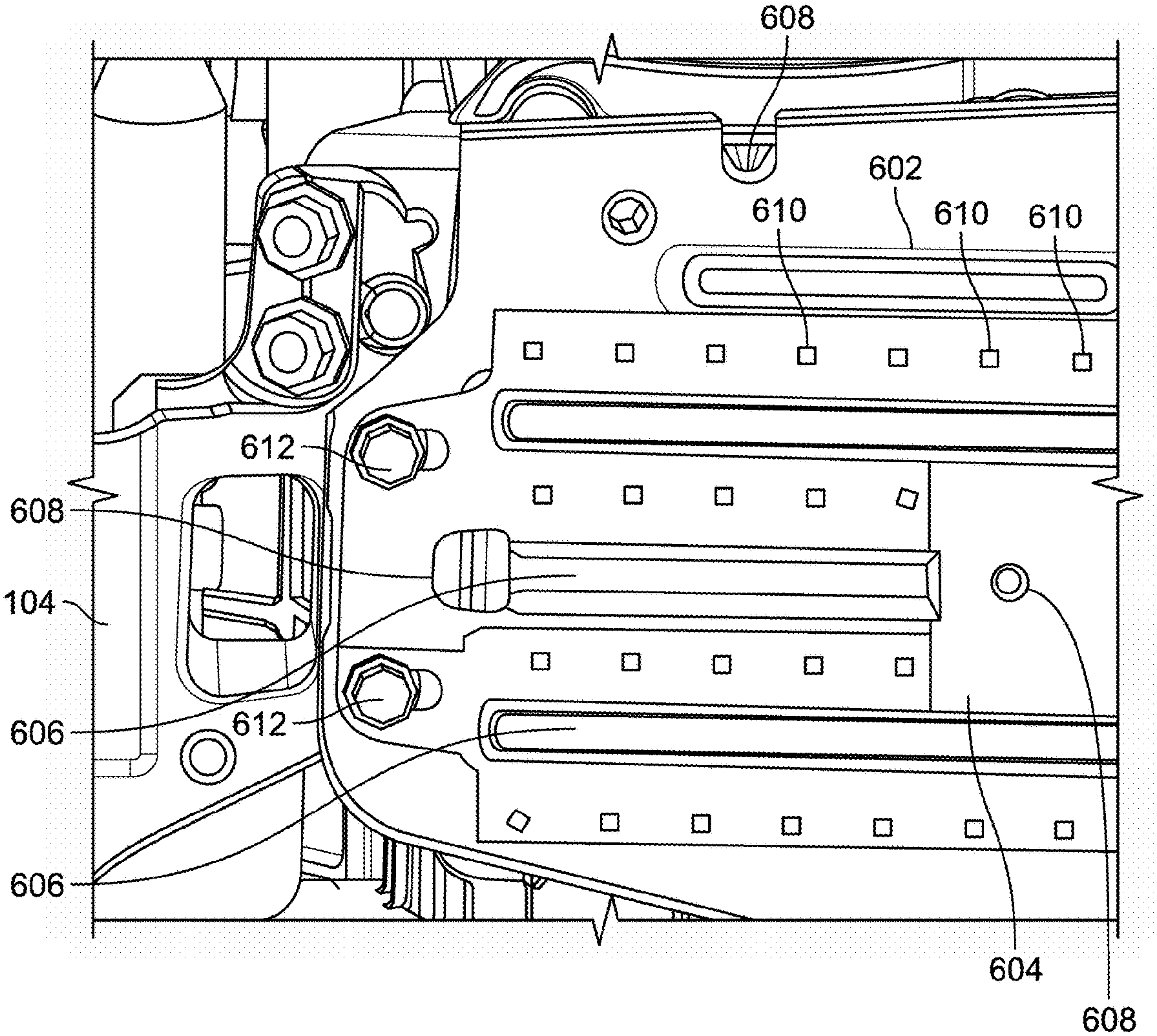
FIG. 6 is a bottom view of an exemplary shear plate, in accordance with some embodiments of the disclosure.

FIG. 6 is a bottom view of shear plate 600, in accordance with some embodiments of the disclosure. Shear plate 600 comprises components that may be incorporated, in whole or in part, to any of FIGS. 1A-5, and 7. Shear plate 600 may be manufactured (or may be incorporated into an assembly), in whole or in part, by method 800 of FIG. 8.

Shear plate 600 comprises first layer 602 and second layer 604. First layer 602 is configured to interface directly with second casting 104 of FIG. 1. Additionally, first layer 602 is configured to receive second layer 604 as part of an overall shear plate assembly. Second layer 604 comprises multiple deformation initiation features. For example, second layer 604 comprises ribs 606, cutouts 608, and material deposits 610. Material deposits 610 may, for example, correspond to weld locations to connect second layer 604 to first layer 602. Second layer 604 is fixedly attached to first layer 602 and second casting 104 via fasteners 612. In some embodiments, second layer 604 is also affixed to first layer 602 and second casting 104 via at least one additional fastener (not shown in FIG. 6). The combination of fasteners 612 with ribs 606, cutouts 608, and material deposits 610 enables shear plate 600 to follow arc 310 of FIG. 3B when second casting 104 is released from the fasteners in response to a front impact event.

Figure 7:
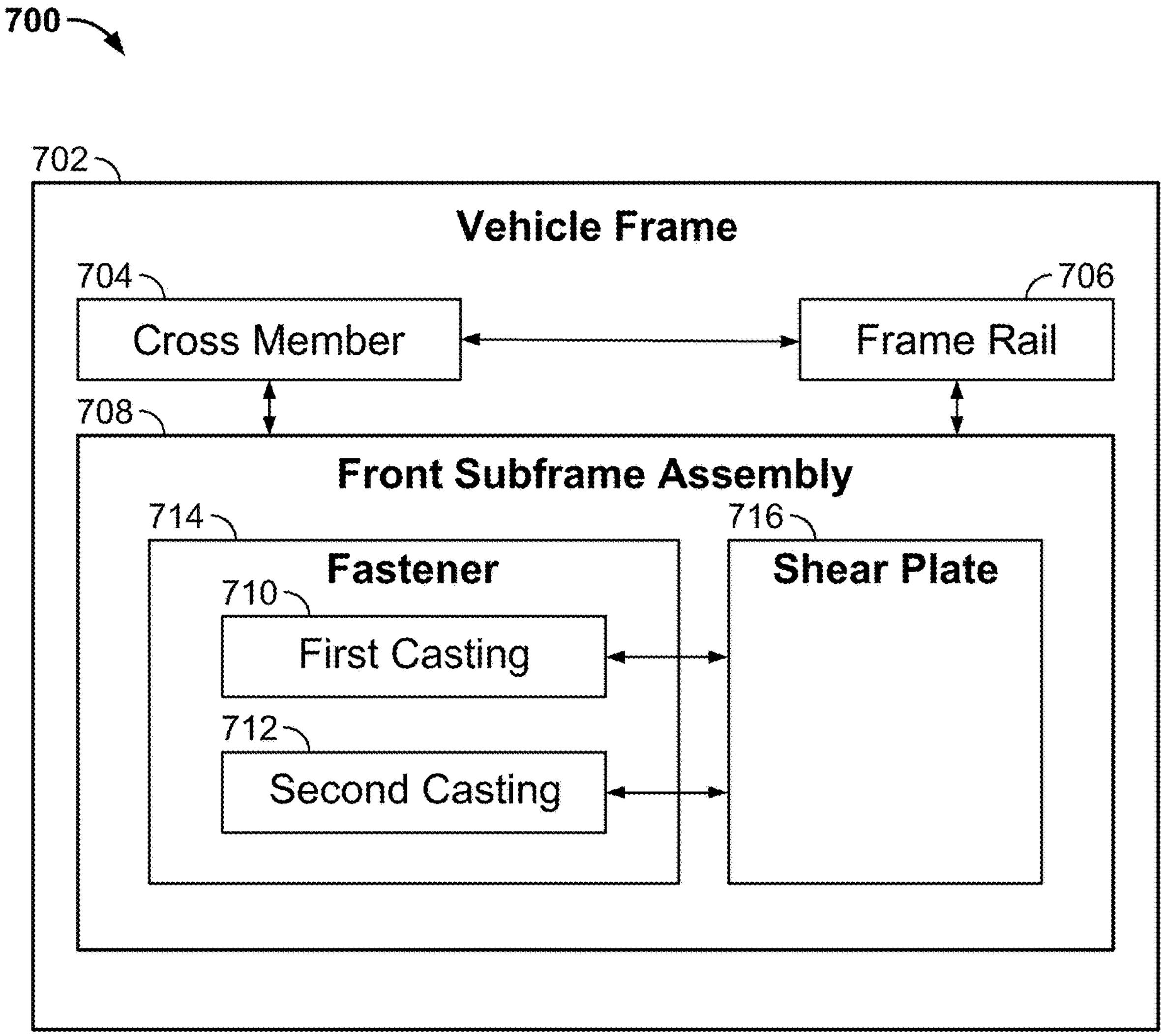
FIG. 7 is a block diagram of a vehicle system, in accordance with some embodiments of the disclosure.

FIG. 7 is a block diagram of vehicle system 700, in accordance with some embodiments of the disclosure. Vehicle system 700 comprises components that may be incorporated, in whole or in part, to any of FIGS. 1A-6. Vehicle system 700 may be manufactured (or assembled), in whole or in part, by method 800 of FIG. 8.

Vehicle system 700 comprises vehicle frame 702. Crossmember 704 is fixedly attached to frame rail 706. Front subframe assembly 708 is coupled to both crossmember 704 and frame rail 706. Front subframe assembly 708 is comprised of first casting 710, second casting 712, fastener 714, and shear plate 716. First casting 710 comprises a first angled joint surface. The first angled joint surface comprises a first angled profile that extends upwards from a rear edge of the first fracture joint surface at an angle between 20 and 30 degrees above a horizontal plane defined by the rear edge (e.g., as shown in FIGS. 1A-D). Second casting 712 comprising a second angled joint surface. The second angled joint surface comprises a second angled profile that extends downwards from a front edge of the second fracture joint surface at an angle between 20 and 30 degrees below a horizontal plane defined by the front edge (e.g., as shown in FIGS. 1A-D). Fastener 714 compresses the first angled joint surface to the second angled joint surface. A first end of shear plate 716 is coupled to first casting 710 and a second end of shear plate 716 is coupled to second casting 712.

Figure 8:
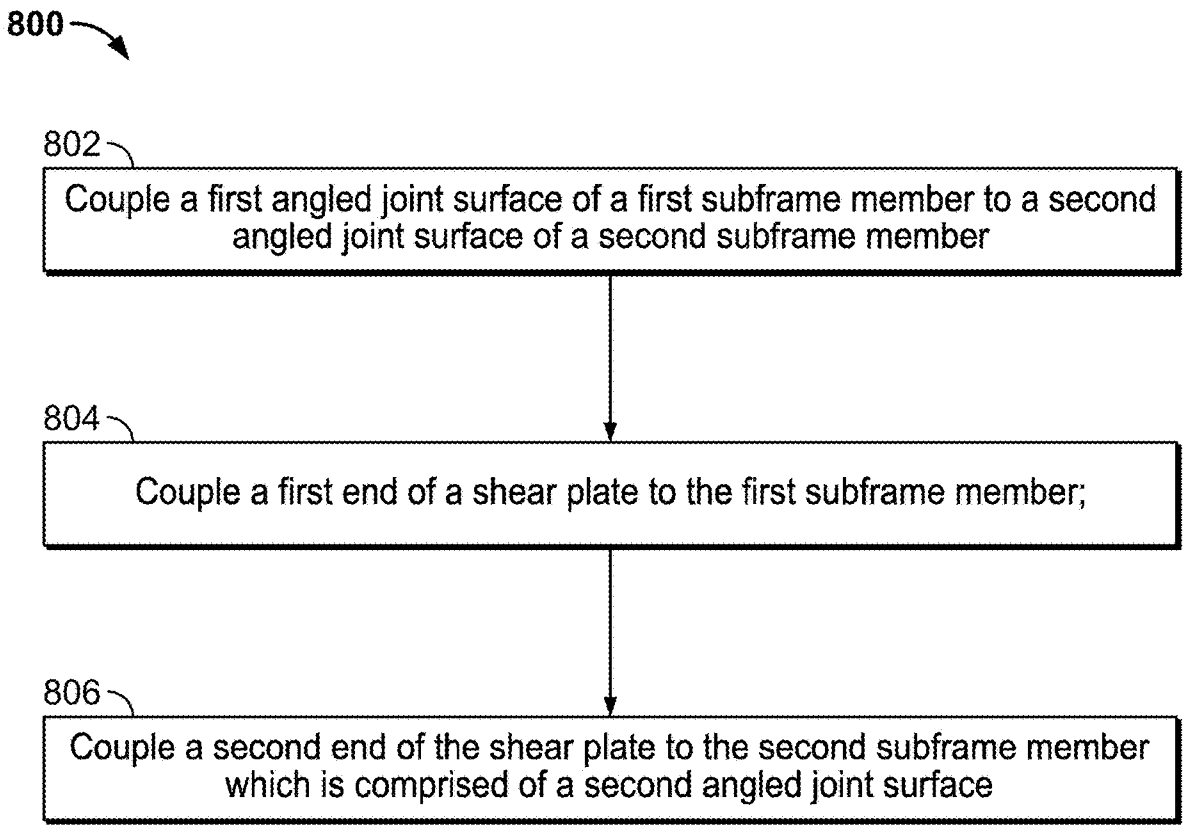
FIG. 8 is a flow chart representing an illustrative process for manufacturing a front subframe assembly, in accordance with some disclosed methods and embodiments.

FIG. 8 is a flow chart representing process 800 for manufacturing a front subframe assembly, in accordance with some disclosed methods and embodiments. Any of the systems, assemblies, components, vehicles, and the like, shown in FIGS. 1A-7 may be manufactured (or assembled), in whole or in part, by method 800 of FIG. 8.

At 802, a first angled joint surface of a first subframe member is coupled to a second angled joint surface of a second subframe member. The first angled joint surface comprises a first angled profile that extends upwards from a rear edge of the first fracture joint surface at an angle between 20 and 30 degrees above a horizontal plane defined by the rear edge. At 804, a first end of a shear plate is coupled to the first subframe member. At 806, a second end of the shear plate is coupled to the second subframe member which is comprised of a second angled joint surface. The second angled joint surface comprises a second angled profile that extends downwards from a front edge of the second fracture joint surface at an angle between 20 and 30 degrees below a horizontal plane defined by the front edge. An assembly comprised of the first subframe member, the shear plate, and the second subframe member may be fixedly attached or coupled to at least one frame rail or a component of a vehicle frame. For example, the assembly may be considered a subframe to be secured to a vehicle frame in order to achieve intended deformation criteria in response to a front impact event (e.g., as shown in FIGS. 4A and 4B). In some embodiments, the assembly is attached to at least one of a vehicle frame, a frame rail, or a crossmember as part of a vehicle assembly manufacturing process. In some embodiments, the assembly may be formed and assembled at one or more first locations then transported to a second location where the overall vehicle assembly is put together. Alternatively, the assembly and the vehicle comprise one or more components that are at least one of formed or assembled in a single location.

Figure 9:
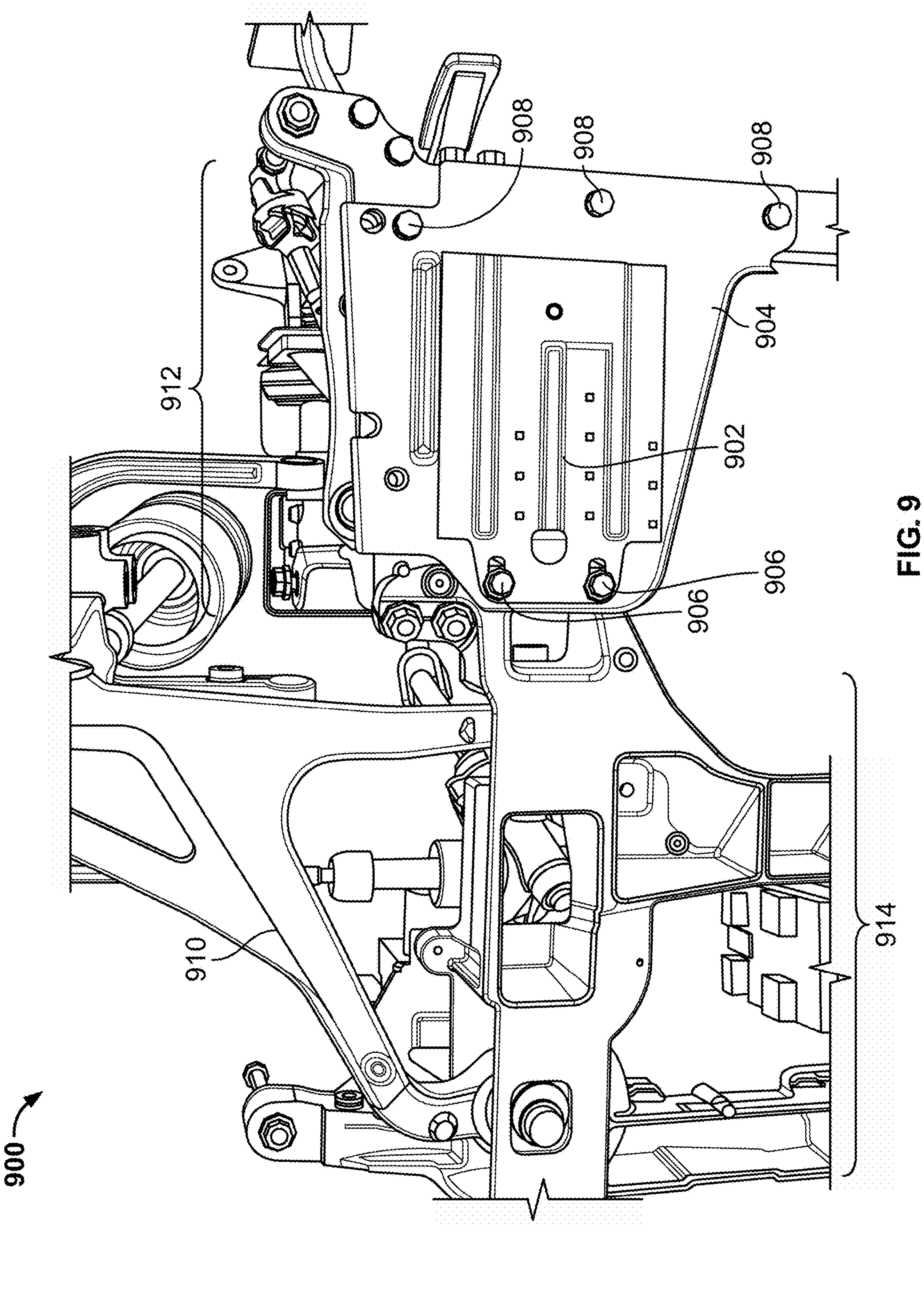
FIG. 9 is a bottom view of shear plate assembly, in accordance with some embodiments of the disclosure.

FIG. 9 is a bottom view shear plate assembly 900, in accordance with some embodiments of the disclosure. Shear plate assembly 900 comprises components that may be incorporated, in whole or in part, to any of FIGS. 1A-7. Shear plate assembly 900 may be manufactured (or may be incorporated into an assembly), in whole or in part, by method 800 of FIG. 8.

Shear plate assembly 900 comprises first layer 902 and second layer 904. Second layer 904 is configured to interface directly with second casting 104 of FIG. 1 which is represented by subframe assembly 912. Additionally, second layer 904 is configured to receive (e.g., interface with or have first layer 902 fixedly attached) first layer 902 as part of an overall shear plate assembly comprised of first layer 902 and second layer 904. First layer 902 comprises multiple deformation initiation features (e.g., as described in detail in reference to FIG. 6). First layer 902 is fixedly attached to second layer 904 and second casting 104 via front end fasteners 906 while second layer 904 is affixed or fixedly attached to second casting 104 by both front end fasteners 906 and rear end fasteners 908. Having fasteners at either end of second layer 904 enables the controlled deformation of shear plate assembly 900 as described in reference to FIGS. 2B and 3B. Also shown in FIG. 9 are suspension component 910 and forward subframe assembly 914. Forward subframe assembly 914 is configured to be swung below first layer 902 in response to an impact event (e.g., along arc 310 of FIG. 3B). Suspension component 910 is configured to deform down and away from rear end fasteners 908 as guided by the deformation of shear palate assembly 900 in response to an impact event as described in this disclosure.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to examples, any such reference is merely to provide context to the instant disclosure and does not form any admission as to what constitutes the state of the art.

What is claimed is:

1. A vehicle subframe assembly comprising:
- a first casting comprising a first fracture joint surface, wherein the first fracture joint surface comprises a first angled profile that extends upwards from a rear edge of the first fracture joint surface at an angle between 20 and 30 degrees above a horizontal plane defined by the rear edge;
- a second casting comprising a second fracture joint surface, wherein the second fracture joint surface comprises a second angled profile configured to interface with the first angled profile; and
- a shear plate, wherein:
  - a first end of the shear plate is fixedly attached to the first casting; and
  - a second end of the shear plate is fixedly attached to the second casting.

2. The vehicle subframe assembly of claim 1, wherein:
- the shear plate is comprised of two layers; and
- at least one layer is comprised of at least one deformation initiation feature.

3. The vehicle subframe assembly of claim 1, wherein the second casting is comprised of a hole configured to interface with a frame rail by at least one fastener.

4. The vehicle subframe assembly of claim 1, wherein the second casting is fixedly attached to a frame crossmember.

5. The vehicle subframe assembly of claim 1, wherein the shear plate comprises at least one deformation initiation feature configured to cause deformation of the shear plate that separates the first casting from the second casting.

6. The vehicle subframe assembly of claim 1, further comprising a fastener arranged to compress the first fracture joint surface against the second fracture joint surface.

7. The vehicle subframe assembly of claim 1, wherein:
- the shear plate is comprised of two layers;
- the two layers are fixedly attached to each other by at least one first fastener at the first end; and
- one of the two layers is fixedly attached to a crossmember of a vehicle frame at the second end.

8. The vehicle subframe assembly of claim 1, wherein:
- the first end of the shear plate is fixedly attached to the first casting by a first pair of fasteners; and
- the second end of the shear plate is fixedly attached to the second casting by a second pair of fasteners.

9. A front subframe assembly comprising:
- a first casting coupled to a frame rail, the first casting comprising a first angled joint surface comprising a first angled profile that extends upwards from a rear edge of the first angled joint surface at an angle between 20 and 30 degrees above a horizontal plane defined by the rear edge;
- a second casting coupled to a crossmember affixed to the frame rail, the second casting comprising a second angled joint surface;
- a fastener compressing the first angled joint surface to the second angled joint surface; and
- a shear plate, wherein;
  - a first end of the shear plate is coupled to the first casting; and
  - a second end of the shear plate is coupled to the second casting.

10. The front subframe assembly of claim 9, wherein:
- the shear plate is comprised of two layers; and
- at least one layer is comprised of at least one deformation initiation feature.

11. The front subframe assembly of claim 9, wherein the second casting is comprised of a hole configured to interface with the frame rail by at least one fastener.

12. The front subframe assembly of claim 9, wherein the second casting is fixedly attached to the crossmember.

13. The front subframe assembly of claim 9, wherein the shear plate comprises at least one deformation initiation feature configured to cause deformation of the shear plate that separates the first casting from the second casting.

14. The front subframe assembly of claim 9, wherein:
- the first end of the shear plate is fixedly attached to the first casting by a first pair of fasteners; and
- the second end of the shear plate is fixedly attached to the second casting by a second pair of fasteners.

15. The front subframe assembly of claim 9, wherein the shear plate is configured to remain fixedly attached to each of the first casting and the second casting in response to a front impact event.

16. The front subframe assembly of claim 9, wherein a length of the shear plate corresponds to a deformation arc radius of the first casting such that the first casting avoids vehicle components arranged rearward of the front subframe assembly.

17. A vehicle frame comprising:
- a frame rail;
- a crossmember fixedly attached to the frame rail; and
- a front subframe assembly coupled to the frame rail and the crossmember, the front subframe assembly comprising:
  - a first casting comprising a first angled joint surface comprising a first angled profile that extends upwards from a rear edge of the first angled joint surface at an angle between 20 and 30 degrees above a horizontal plane defined by the rear edge;
  - a second casting comprising a second angled joint surface;
  - a fastener compressing the first angled joint surface to the second angled joint surface; and
  - a shear plate, wherein:
    - a first end of the shear plate is coupled to the first casting; and a second end of the shear plate is coupled to the second casting.

18. The vehicle frame of claim 17, wherein:

the shear plate is comprised of two layers;

the two layers are fixedly attached to each other by at least one first fastener at the first end; and one of the two layers is fixedly attached to the crossmember at the second end.

* * * * *